United States Patent [19]

Godshall

[11] Patent Number: 4,761,487

[45] Date of Patent: Aug. 2, 1988

[54] METHOD FOR IMPROVING VOLTAGE REGULATION OF BATTERIES, PARTICULARLY LI/FES$_2$ THERMAL BATTERIES

[75] Inventor: Ned A. Godshall, Albuquerque, N. Mex.

[73] Assignee: The United States of America as represented by the United States Department of Energy, Washington, D.C.

[21] Appl. No.: 872,718

[22] Filed: Jun. 10, 1986

[51] Int. Cl.$^4$ .................. H01M 6/36; H01M 4/36
[52] U.S. Cl. ............................ 429/112; 429/221; 252/182.1
[58] Field of Search .................. 429/112, 221; 252/182.1

[56] References Cited

U.S. PATENT DOCUMENTS

| | | | |
|---|---|---|---|
| 3,907,589 | 9/1975 | Gay et al. | 429/221 X |
| 3,992,222 | 11/1976 | Walsh et al. | 429/221 X |
| 4,084,045 | 4/1978 | Kegelman | 429/194 X |
| 4,143,213 | 3/1979 | Jacobson et al. | 429/194 X |
| 4,164,069 | 8/1979 | Tomczuk | 429/221 X |
| 4,172,926 | 10/1979 | Shimotake et al. | 429/112 |
| 4,223,078 | 9/1980 | Armand et al. | 429/194 |
| 4,233,378 | 11/1980 | Joo et al. | 429/221 X |
| 4,383,014 | 5/1983 | Armijo et al. | 429/112 |
| 4,409,168 | 10/1983 | Mrazck et al. | 429/112 X |

OTHER PUBLICATIONS

Godshall et al., "Thermodynamic Investigations of Ternary Lithion Transition Metal Oxygen Cathode Materials", *Mat. Res. Bul.*, v. 15, pp. 561-570, 1980.

Godshall et al. "Relationships Among Electrochemical Thermodynamic and Oxygen Potential Quantities in Lithium Transition Metal Oxygen Morten Salt Cells", *J. Electrochem Soc.*, v. 131, No. 3, pp. 543-549, Mar. 1984.

Sy et al., "Argunne National Lab Report", 71-17, 47, (1977).

Tomczuk et al., "EMF Measurements on the Li--AL/FeS Couple in LiF-LiCl-LiBr Electrolyte, *J. Electrochem Soc.*, v. 128, pp. 2251, (1981).

*Primary Examiner*—Brian E. Hearn
*Assistant Examiner*—Stephen J. Kalafut
*Attorney, Agent, or Firm*—Armand McMillan; James H. Chafin; Judson R. Hightower

[57] ABSTRACT

Batteries are improved, especially with respect to voltage regulation properties, by employing as anode and cathode compositions, those which fall in a thermodynamically invariant region of the metallurgical phase diagram of the combination of the constituent components. The invention is especially useful in the Li/FeS$_2$ system.

4 Claims, 4 Drawing Sheets

Li-Fe-S TERNARY PHASE DIAGRAM

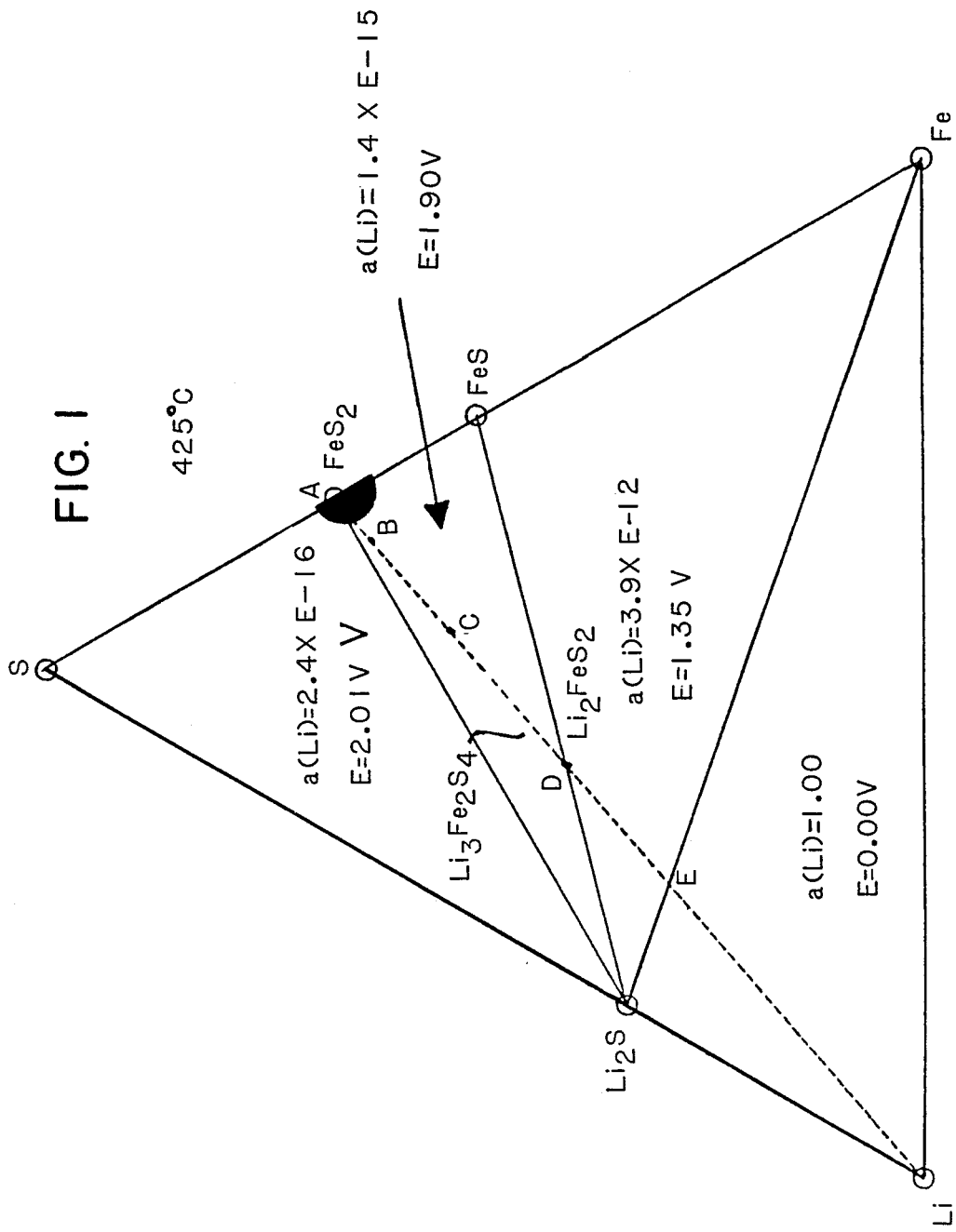

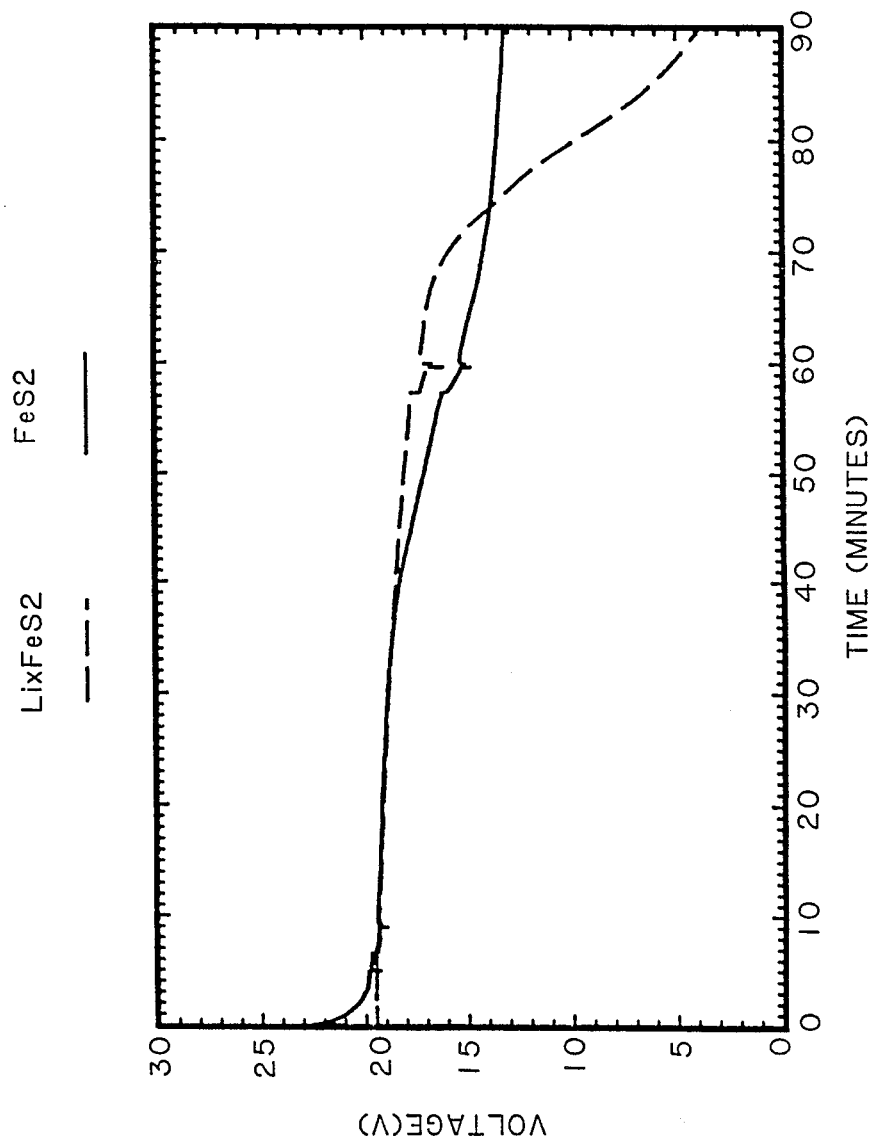

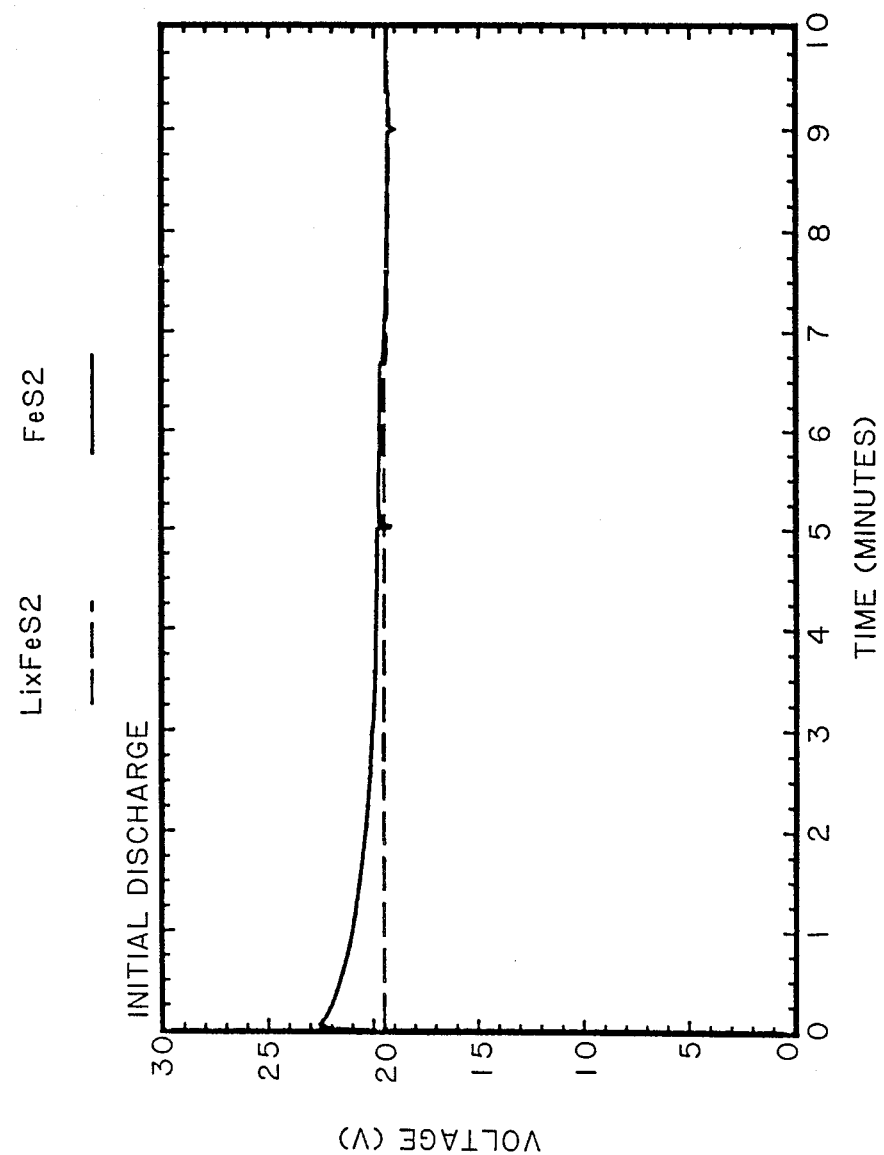

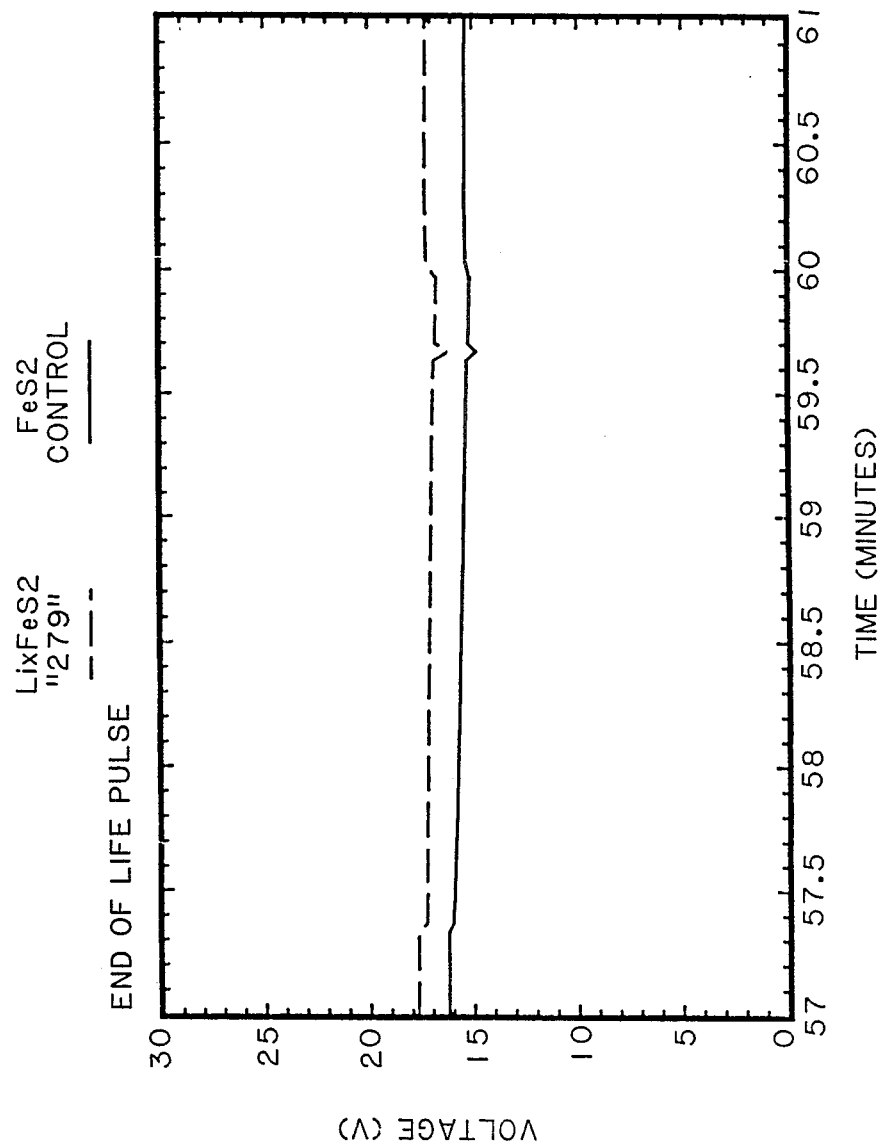

METHOD FOR IMPROVING VOLTAGE REGULATION OF BATTERIES, PARTICULARLY LI/FES$_2$ THERMAL BATTERIES

The U.S. Government has rights in this application pursuant to Contract No. DE-AC04-76DP00789 between the U.S. Department of Energy and AT&T Technologies, Inc.

BACKGROUND OF THE INVENTION

This invention relates to a new technique for improving the electrical characteristics, particularly the voltage regulation properties of batteries, e.g., the Li/FeS$_2$ thermal battery.

In many galvanic systems, a variety of voltage irregularities is known to occur. These include voltage transients or voltage "spikes" during initial discharge or at other times, plateaus during discharge, inconsistencies during discharge, particularly near the end of useful discharge life, lot to lot irreproducibility, intra-lot irreproducibility, etc. There has long been a need to eliminate or ameliorate these difficulties.

In the very common lithium/iron disulfide battery, such voltage irregularities are particularly bothersome. These batteries essentially comprise a lithium metalcontaining anode (negative electrode) and an iron disulfide-containing cathode (positive electrode). Some operate at ambient (room) temperature or intermediate temperatures (approximately 150° C.) and utilize a liquid non-aqueous electrolyte. Others operate at very high temperatures (e.g., greater than 300° C.) and utilize a molten salt electrolyte (thermally activated batteries). The latter usually employ a higher melting lithium alloy for the negative electrode rather than pure lithium, e.g., Li(Al) or Li(Si). In addition to the solid anode and cathode components, such batteries also include heat pellets which are ignitable thereby supplying sufficient heat to render the electrolyte molten and to initiate the discharge of the battery.

Both forms of the battery are well known. For example, U.S. Pat. Nos. 4,172,926, 4,164,069, 3,992,222, 4,223,078 and 4,084,045 deal with prior art rechargeable (secondary) or ambient temperature batteries of the Li/Fe/S system. U.S. Pat. No. 4,383,014 is typical of prior art attempts at improving the voltage inconsistencies existing in known thermal batteries. It attempts to eliminate the bothersome initial voltage transient ("spike") by inclusion in the cathode composition of an empirically found additive (CaSi$_2$) theorized to produce local short-circuiting (depolarization) immediately after initiation of the battery. However, this and other attempted solutions have been entirely unsatisfactory.

There remains a serious need for improvements in the voltage regulation of batteries, e.g., thermal batteries, e.g., including amelioration or elimination of voltage transients, voltage fall-offs, plateauing effects, and other voltage irregularities as well as a lengthening of useful discharge lifetimes, and improvements in reproducibility as mentioned above.

SUMMARY OF THE INVENTION

Accordingly, it is an object of this invention to provide improved batteries and a new method for improving the voltage regulation characteristics of batteries, in particular thermal batteries, most particularly Li/FeS$_2$ thermal batteries, e.g., to satisfy the needs mentioned above.

It is another object of this invention to ameliorate or eliminate the voltage irregularities known in the prior art, in particular with respect to Li/FeS$_2$ batteries.

Upon further study of the specification and appended claims, further objects and advantages of this invention will become apparent to those skilled in the art.

These objects have been achieved by providing in a Li/FeS$_2$ thermal battery comprising an anode and a cathode, the improvement wherein the cathode has an initial total composition of its constituent components which falls in a thermodynamically invariant region of the metallurgical phase diagram of the combination of said components, whereby the voltage regulation properties of the battery are improved.

In a preferred aspect, the invention relates to the use as a cathode composition, of FeS$_2$ to which a sufficient amount of lithium has been added such that the resultant composition falls into a 3-phase thermodynamically invariant region of the Li/Fe/S phase diagram.

In another aspect, this invention concerns, in a battery comprising an anode of a total initial anode composition and a cathode of a total initial cathode composition, at least one of said compositions having at least two chemical components, and at least one of said two component-containing compositions being in a thermodynamically non-invariant state of the corresponding metallurgical phase diagram, said battery having measurable voltage regulation properties, the improvement wherein at least one of said anode or cathode total initial compositions which is in said non-invariant state is replaced by a composition which falls in a thermodynamically invariant region of the metallurgical phase diagram of the combination of its components, whereby said voltage regulation properties are improved.

In another aspect, this invention relates to a method of improving the voltage regulation properties of a battery comprising an anode of a total initial anode composition and a cathode of a total initial cathode composition, at least one of said compositions having at least two chemical components, and at least one of said two component-containing compositions being in a thermodynamically non-invariant state of the corresponding metallurgical phase diagram, said battery having measurable voltage regulation properties, comprising using in place of at least one of said anode or cathode total initial compositions which are in said non-invariant state, a corresponding composition which falls in a thermodynamically invariant region of the metallurgical phase diagram for the combination of its components, whereby said voltage regulation properties are improved.

In especially preferred aspects, all initial compositions fall in invariant regions of the respective phase diagram.

In particularly important aspects of such improved batteries and methods, a voltage spike (occurring upon initiation or otherwise) or other serious voltage irregularity is eliminated or ameliorated and/or the useful discharge lifetime of the battery is significantly improved.

In yet another aspect of this invention, there is provided, in a battery composition useful as the cathode of a Li/FeS$_2$ thermal battery consisting essentially of substantially pure FeS$_2$, the improvement wherein sufficient lithium is added to said composition whereby the resultant composition falls into a three-phase thermodynamically invariant region of the Li/Fe/S diagram.

This invention also relates to substantially pure $Li_xFeS_2$, wherein x is a number sufficient to cause said composition to fall in a three-phase, thermodynamically invariant region of the Li/Fe/S metallurgical phase diagram. In another aspect, it relates to such a composition substantially free of the cathodic discharge products formed during discharge of a $Li/FeS_2$ thermal battery. For these new materials, x is not 1.5 or 2.

In a further aspect, this invention relates to a composition of the formula $Li_xFeS_2M_y$, substantially free of the cathodic discharge products formed during discharge of a $Li/FeS_2$ thermal battery having a cathode substantially of said formula, wherein $LiM_y$ is a lithium salt or alloy which can be used to prepare said cathode composition by addition of $LiM_y$ to $FeS_2$, and x is the number of moles of lithium added to $FeS_2$ in the form of $LiM_y$, per mole of Fe. "y" is the number of moles of moiety M in the salt or alloy per one mole of Li. In a preferred aspect, such a composition is substantially free of the cathodic discharge products formed during the discharge of the corresponding $Li/FeS_2$ thermal battery.

In still another aspect, this invention relates in a battery comprising an anode of a total initial anode composition and a cathode of a total initial cathode composition, at least one of said compositions having at least two chemical components, and at least one of said two component-containing compositions being in a thermodynamically non-invariant state of the corresponding metallurgical phase diagram, or, during the discharge of the battery, passing through such a non-invariant state, said battery having measurable voltage regulation properties, the improvement comprising using in place of at least one of said anode or cathode total initial compositions which are in said non-invariant state, a corresponding composition which falls in a thermodynamically invariant region of the metallurgical phase diagram for the combination of its components, or using in place of at least one of said anode or cathode total initial compositions which passes through a non-invariant state during discharge, a composition which does not pass through a non-invariant state during discharge or which has a lower probability of passing through a non-invariant state during discharge, whereby said voltage regulation properties are improved.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein:

FIG. 1 is the isothermal Li-Fe-S ternary phase diagram;

FIG. 2 shows the discharge curves of standard (solid) and lithiated(—)lithium-iron disulfide batteries;

FIG. 3 shows the initial 10 minutes of the discharge curve of FIG. 2; and

FIG. 4 shows the final 4 minutes of the useful discharge of FIG. 2 in the first plateau region; and

DETAILED DISCUSSION

In one aspect, this invention can be described as providing the mentioned voltage regulation improvement by a technique of fixing anode/cathode component chemical potentials (activities) initially and/or throughout the discharge lifetime of the battery. As mentioned, this new approach greatly improves voltage regulation of batteries, including lithium iron-disulfide thermally activated batteries. In particular, there are achieved total elimination of the initial voltage transient noted in the latter batteries and an improvement in the voltage regulation at the end of discharge of long-life thermally activated batteries. As well, battery reproducibility is enhanced and lot to lot variations are minimized.

Much of this disclosure is framed in terms of the $Li/FeS_2$ thermal battery; however, the underlying principles are directly applicable to other battery systems wherein voltage regulation is to be improved. As well, it is fully applicable to the electrochemical cells, galvanic cells, etc.

The measurement of open circuit voltages at various points on a battery discharge curve (equilibrium potential curve) can be related to the corresponding phase equilibria in the battery electrodes. (Godshall et al, *J. Electrochem. Soc.* 131:543 (1984), which disclosure is incorporated by reference herein.

An equilibrium potential curve is simply a battery discharge curve obtained at infinitesimally small currents. Conversely, an understanding of an electrode's phase equilibria can lead to the exact control of a battery's voltage. See, e.g., Godshall et al, *Mat. Res. Bull.* 15:561 (1984), which is incorporated by reference herein.

The equilateral triangle of FIG. 1 represents an isothermal, isobaric section of a complete three-dimensional ternary phase diagram. The temperature axis lies perpendicular to the basal Gibbs composition triangle. The three active elements found in the cathode of a conventional thermal battery (Li, Fe and S) lie at the corners of the diagram. Each of the three sides of the ternary phase diagram therefore represents a binary phase diagram between two of the three elements found in the ternary system. The darkened area near $FeS_2$ represents a single-phase region, and the lines (i.e., the line widths) represent two-phase regions, in which the lines themselves denote tie lines, the same as are found in two-phase regions in binary phase diagrams. The open areas represent regions of three phases in equilibrium, or tie triangles.

Single-phase regions in a ternary system at constant temperature and pressure are bivariant. This is a direct result of the Gibbs phase rule at constant temperature and pressure: $F=C-P$, wherein F is the degree of freedom, C the number of component elements in the cathode, and P the number of phases in the cathode. That is, two composition parameters must be fixed for all the intensive variables of a single-phase region to be invariant. However, two-phase equilibria in ternary systems have only one degree of freedom ($F=1$). not until three phases coexist in equilibrium at constant temperature and pressure is a thermal battery cathode truly invariant ($F=0$). Thus, the activity of lithium (and, it turns out, the battery voltage) within threephase regions does not change with the amount of lithium in the cathode (i.e., the amount of battery discharge). Therefore, if a battery per this invention is constructed with an initial cathode composition which lies any-where inside one of the open triangles of FIG. 1, no voltage "spike" will be possible since the lithium activity is fixed, which in turn fixes the battery voltage at a constant value. This can be accomplished in accordance with this invention, by lithiating, i.e., adding lithium to the conventional FeS$_2$ starting composition, thus moving the latter out of the one-phase region and into the three-phase region. Furthermore, battery capacities may be predicted from the size of these tie triangles The width and number of tie triangles is directly correlated with the length and number of battery discharge plateaus.

The path over which the overall composition of a standard thermal battery cathode material (FeS$_2$) changes is shown schematically by the dashed line of FIG. 1. The composition of any point on this discharge path is given by Li$_x$FeS$_2$, where x increases as discharge proceeds. As lithium is electrochemically reacted with FeS$_2$ (Point A, FIG. 1), it is possible for the electrode composition to pass through one-, two-, and threephase regions. A corresponding discharge curve is illustrated in FIG. 2 (solid line), where the voltage in one- and two-phase regions results in the initial "spike". Conversely, battery cathodes prepared at an initial composition which lies within a tie triangle (such as Point B) have a well-defined, and thermodynamically-fixed voltage of 1.95V/cell (vs. a Li(Si) anode) corresponding to FIG. 2 (dashed line).

The free energy of any reaction (G$_r$) is especially informative about electrochemical reactions, because it directly determines a cell's open-circuit voltage (E) from the simple reaction:

$$E = \Delta G_r / zF \tag{1}$$

where is the number of electrons transferred per mole of reaction, and F is the Faraday constant (23.06 kcal/volt/mole). For example, if the Li/FeS$_2$ thermal battery produced current from the reaction:

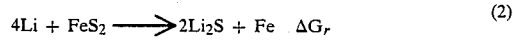

the voltage could be predicted from the corresponding free energies of formation ($\Delta G_f$) found in standard thermochemical tables, e.g., in I. Barin et al, *Thermochemical Properties of Inorganic Substances*, Springer-Verlag, New York, (1977):

$$-zFE = \Delta G_r = 2\Delta G_f(\text{Li}_2\text{S}) + \Delta G_f(\text{Fe}) - \Delta G_f(\text{FeS}_2) - 4\Delta G_f(\text{Li}) \tag{3}$$

$$E = 1.656 \text{ Volts vs 44 w/o Li(Si)} \tag{4}$$

From standard thermochemical data, the open-circuit voltage of a Li/FeS$_2$ battery is predicted to be 1.656V, if Reaction 2 was the exact electrochemical reaction occurring in the cathode of the thermal battery. However, the hypothetical Li/FeS$_2$ electrochemical reaction changes slightly when the stability of the binary compound FeS is considered. The overall battery cathode composition is once again assumed to start at FeS$_2$, x=0 (Point A) and end at the Li$_2$S/Fe tie line, x=4 (Point E). However, the existence of compound FeS demands that a tie line exist between it and Li$_2$S, splitting the former large FeS$_2$/Fe/Li$_2$S tie triangle into two smaller tie triangles at x=2 (Point D). This is especially significant in a battery sense, since it now predicts a two-plateau discharge for a battery utilizing all its theoretical electrochemistry. Because of heat retention limitations, however, most Li/FeS$_2$ thermal batteries do not utilize their entire electrochemical capability. For example, even a one hour long life thermal battery discharge (LLTB) uses only 8.4 Amin/g FeS$_2$ (x=0.628 in Li$_x$FeS$_2$), or 15.7% of the theoretical total reduction of iron to zero valence. This "end-of-life" point is labeled as Point C in FIG. 1.

The corresponding *total* electrochemical reaction remains the same as given by Reaction 2, but is now split into a sequential two-step process:

vs. Li(Si)

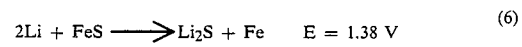

Because the energy (area under the discharge curve) must be the same when considering FeS as without FeS, a general principle is developed: the presence of a stable compound (FeS) splits a large single voltage plateau (tie triangle) into two smaller voltage plateaus (tie triangles), and always raises the voltage of the upper plateau (1.95V) and lowers the voltage of the lower plateau (1.38V), relative to the voltage of the single plateau (1.656V) present if that compound (FeS) did not exist. This is because the battery voltage is derived from the thermodynamic free energy of reaction ($\Delta G_r$). This, in turn, is the difference between the free energy of formation $\Delta G_f$ of reactants and products of the electrochemical reaction, Equation 3. Battery voltage is therefore increased by increasing the thermodynamic stability of the products or by decreasing the stability of the reactants. The presence of a stable compound, such as FeS, (relative to no compound being present) therefore acts as a product in the first voltage plateau (Reaction 5), thereby increasing its voltage; yet acts as a reactant in the second voltage plateau (Reaction 6), thereby decreasing its voltage. Furthermore, the more stable this compound is, the larger will be the difference between the two plateau voltages.

Therefore, as both binary and ternary compounds are added to the ternary phase diagram of FIG. 1 (increasingly reflecting the actual Li-Fe-S phase equilibria), it is to be expected that more tie lines will dissect the discharge path, leading to more tie triangles in the phase diagram and more voltage plateaus on the battery discharge curve. Each such tie line will raise the voltage of the tie triangle above it and lower the voltage of the tie triangle below it. However, the total energy inherent in the battery will remain unchanged.

The theoretical calculations above have considered only binary compounds, which lie on the edges of the isothermal ternary phase diagram. The actual Li-Fe-S ternary phase diagram also includes ternary (Li$_x$FeS$_y$) compounds, which lie in the interior of the Gibbs triangle of FIG. 1. At least two ternary compounds exist in the Li-Fe-S system at 425° C. They are the compounds Li$_3$Fe$_2$S$_4$ (at x=1.5) and Li$_2$FeS$_2$ (at x=2.0). See Sy et al, Argonne National Laboratory Report ANL-77-17,47 (1977), inter alia and Tomczuk et al, *J. Electrochem. Soc.*, 128:2255 (1981), which disclosure is incorporated by reference herein. The Li$_2$FeS$_2$ compound lies on the FeS/Li$_2$S tie line, which has been included previously. Both compounds, interestingly, lie directly on the Li/FeS$_2$ battery discharge path. The presence of these compounds complicates the simplistic ternary phase diagram illustrated in FIG. 1; however, neither compound greatly alters the thermodynamic treatment or its effect on battery performance.

In addition to fixing the lithium activity (and hence the voltage, which eliminates the initial "voltage spike"), the initial multi-phase lithiation process also fixes the activity of the other two main elements in the Li/FeS$_2$ thermal battery: sulfur and iron. This has the advantage of making the entire battery a more welldefined electrochemical couple. Lithiated cathode batteries are less prone to exhibit the second lowvoltage plateau at the end of discharge, because nucleation sites for reaction products (Li$_2$S, FeS, and Li$_3$Fe$_2$S$_4$) are already present in the initial cathode composition, due to the sulfur, lithium, and iron activities being well-defined by the multi-phase process. Conversely, previous standard FeS$_2$ cathodes may prematurely (before x=2, Point D) begin to discharge to lower reaction products (e.g., Fe), because the equilibrium product phases (e.g., FeS and Li$_3$Fe$_2$S$_4$) may be more difficult to nucleate under the non-equilibrium conditions of a discharging thermal battery.

Thus, this invention improves end of life performance in several ways including longer discharge run time, higher voltage, higher current, and better pulse capability. This is believed due primarily to fixing the sulfur activity in the cathode, which makes the FeS$_2$ less likely to decompose during the initial high battery temperatures seen after match-firing. Consequently, thermal batteries can also be built to operate at higher temperatures, which will, in turn, result in still further increases in discharge run time (i.e., increased end-of-life battery performance).

More details of the phase diagram related to the lithium thermal battery and its relationship to the electrical properties of the latter in accordance with this invention are contained in the current version of Sandia National Laboratories Report No. 85-1758 (1986), the entire contents of which are incorporated by reference herein and are filed herewith as part of this application.

As can be seen, a primary concept of this invention involves the use in a cathode or anode of a battery of an initial composition which lies in the relevant metallurgical phase diagram in a region of thermodynamic invariability, i.e., which lies in a region wherein the number of degrees of freedom in the Gibbs phase rule is 0. Chemical compositions which meet such criteria can be routinely determined from the relevant phase diagram. The latter can be routinely constructed and analyzed from prior art data or can be generated using well known conventional methods.

Typically, it will be desired to select a composition which provides high battery capacity and/or lifetime, i.e., which lies near the beginning of the discharge curve (line) in the invariant zone. For example, in the lithium battery, it will theoretically be desired to choose the total composition of the cathode to be as close to the one- and two-phase region (Point A) as possible. Since only a small fraction of the total capacity of the lithium battery is utilized in practice. as mentioned above, the total composition of the threephase invariant cathode composition per this invention will be chosen well inside the tie triangle. For the lithium battery, the total composition of formula Li$_x$FeS$_2$ will have a value of x greater than about 0.05, usually greater than about 0.1 in order to ensure that the composition lies in the desired invariant threephase region. Preferably, x will have a value in the range of about 0.1 to about 0.75, most preferably about 0.15 to about 0.50 such that the cathode composition lies well outside of the single and two-phase regions but well within the first tie triangle. Higher values of x unacceptably reduce battery capacity.

It will be noted this discussion is framed in terms of the phase diagram at 425° C. under atmospheric pressure. However, there will be no significant effect from changes in temperature and/or pressure within the operating range of most batteries and, in particular, the lithium battery. The details of the phase diagram do not vary significantly with temperature and essentially do not vary at all within the normal pressure ranges encountered in battery operation.

Once a total composition within an invariant region is selected, the corresponding cathode material can be routinely prepared using well known conventional procedures. Typically, the cathode material will be exposed prior to utilization in the battery to conditions which ensure that thermodynamic equilibrium will be reached. In essence, this simply means the reactant starting materials will be combined and raised to a sufficient temperature for a sufficient time to ensure that the equilibrium number of phases is reached by performance of the involved chemical reactions to the equilibrium point. Alternatively, where the conditions used to initiate discharge of the battery also effect a spontaneous reaching of this thermodynamic equilibrium point, the pre-treatment step can be omitted. Instead, upon initiation of the battery (upon heating of the components of the thermal battery to a temperature necessary for reaching the molten state), simultaneously and inherently, the necessary equilibrium number of phases (the invariant state) will be produced. However, it is preferred that the cathode material be preheated to establish the equilibrium number of phases since performance is better at the end of battery life.

In the lithium thermal battery, any lithium-containing compound can be used to effect the necessary lithiation of FeS$_2$. The only requirements are that the lithium compound be either pure Li or be a salt or alloy containing an anion or partner whereby it is compatible with the chemistry of the lithium battery and that the compound have a free energy of reaction with FeS$_2$ which is negative, whereby a spontaneous chemical reaction will ensue under the appropriate thermodynamic conditions. For example, Li, Li$_2$S, Li(Si), LiAl, Li$_2$O, Li$_3$Bi, LiSn, etc., can all be used to achieve the necessary lithiation, among many others. Ideal lithiating materials are lithium metal and Li$_2$S since these introduce no new elements into the battery compositions. The addition of Li$_2$S and FeS in a 1:1 molar ratio (0.53:1 weight ratio), results in the same Li$_x$FeS$_2$ overall composition as does the addition of pure lithium to pure FeS$_2$.

However, it has also been found that utilization of a lithium compound which does add an additional element to this system is very effective. In fact, Li$_2$O is an especially preferred compound. See copending application Ser. No. 872,728, filed 6/10/86, which is entirely incorporated by reference herein. This invention is highly flexible in this regard, since any lithium-containing compound will fix the activity of lithium in the cathode, thereby fixing the voltage and eliminating voltage irregularities such as the mentioned voltage spike. Any lithium source will be effective to prepare the initial cathode composition such that it does not exist in a lithium solid-solubility region when the thermal battery is activated.

Preparation of the lithiated material can be accomplished in a straight forward, simple manner in accordance with conventional considerations. The necessary multi-phase lithiation simply involves mixing of standard $FeS_2$ cathode material with a lithium-containing compound as mentioned above. The overall composition again must be selected within the invariant region of the first tie triangle, thereby fixing the lithium activity. This mixture is then reacted under sufficient conditions of time and temperature to bring the mixture to its equilibrium number of phases in accordance with the metallurgical phase diagram. The specific time and temperature values chosen are not critical. Typically, the temperature will be in the range of about 100°–500° C., preferably 250°–450° C., most preferably about 400° C. and the time in the range of 2–20 hours, preferably about 8 hours. After preparation, the final cathode composition is conventionally prepared by mixing with a conventional electrolyte binder mix as discussed in the literature, e.g., the various references cited herein.

One of the major advantages of this invention contributing greatly to its practical value is that the precise composition of the cathode material is not critical as long as it remains within the invariant region. Of course, it is also preferred that the composition be sufficiently far removed from the two-phase lines which divide the various regions of the phase diagram. Across widths of these lines, there are precipitous changes in lithium activities.

Any conventional auxiliary steps used to enhance the achievement of thermodynamic equilibrium or the attainment of homogeneity and/or intimate mixing can also be included, e.g., grinding steps, sequences of time/temperature cycles, optionally preceded by intermediate grinding steps, e.g., 1–3 such cycles.

Preferred methods of obtaining the multi-phase, invariant composition for this invention are disclosed in co-pending, commonly assigned application Serial No. 872,728, filed 6/10/86.

As mentioned above, where additional elements are introduced in the lithiation step, there is no significant effect on the improvement of this invention as long as the additional element is compatible with the underlying discharge chemistry and other requirements of the battery. For example, in a preferred embodiment, $Li_2O$ is used to effect the lithiation. Using the methods described herein and also in the mentioned Sandia report incorporated above, details of the 4-component phase diagram for the oxygen and other systems can be routinely determined. See also the Godshall et al references incorporated above and the copending application incorporated above. In all such cases, this invention will be applicable as long as the appropriate lithiation defined herein is achieved.

In essence, all operating conditions and other details of the conventional batteries improved by this invention, e.g., the lithium battery discussed herein, will remain fully conventional in this regard; see F. Tepper and D. Yalom, in *Handbook of Batteries and Fuel Cells,* ed. by D. Linden, Chapter 40, p. 40-1, 1984; J. Q. Searcy et al, in *Power Sources* 9, ed. by J. Thompson, Chapter 37, p. 563, 1983; A. R. Baldwin, Sandia National Laboratories Report No. 83-0863 (1984), which are incorporated by reference herein. However, due to the significantly enhanced voltage regulation characteristics achieved by the method of this invention, a greater variability in battery design details and/or methods of preparation will be provided. For example, since undesired voltage features can be eliminated or ameliorated by this invention, design freedoms will be provided which heretofore were precluded because of the deleterious voltage fluctuations cured by this invention.

Among the latter are especially included voltage fluctuations such as the mentioned voltage spikes, particularly initial spikes. In addition, and further surprisingly, this invention leads to significant improvements in voltage regulation toward the end of the useful discharge life time of a battery. Effectively, this significantly increases this lifetime. Further, because of the increased voltage regularity, due at least in part to the fixing of the activities, not only of the electroactive species, e.g., lithium in the lithium battery, but also of the other components species (e.g., iron and sulfur in the lithium battery), the overall voltage reproducibility within a lot of batteries is enhanced and also the lot to lot reproducibility is significantly enhanced. Overall, as mentioned, this invention generically provides very significant improvements in all areas of voltage regulation.

For any battery system having problems with voltage regulation, this invention will be applicable where the battery as operated involves the use of an anode and/or cathode composition which begins at or passes through a region in the corresponding phase diagram which is thermodynamically non-invariant. By straightforward application of the principles of this invention, in view of the guidance of this disclosure, the corresponding voltage irregularities can be eliminated or ameliorated by replacing the mentioned composition by one which at the initiation of the discharge is in an invariant region or which, during discharge, avoids or lessens the change of passage through a non-invariant region causing the mentioned voltage irregularities. Details of corresponding compositions in accordance with this invention can be routinely determined by appropriate inspection and analysis of the corresponding phase diagram. See also the Godshall et al references incorporated above. Similarly, where a battery of interest has a voltage irregularity, routine conventional procedures, perhaps in conjunction with preliminary experiments, can be utilized in order to determine whether the voltage irregularity is at least partially due to existence during the discharge of a composition falling in a noninvariant region of the corresponding phase diagram. Particularly notable systems to which this invention is applicable include Li/CuO, $Li/MnO_2$ and $Li/CF_x$ and Li/FeS.

In an aspect of this invention related to the lithium battery, new compositions are provided as mentioned above, e.g., substantially pure $Li_xFeS_2$, wherein x is a number which ensures that the resultant composition falls within the necessary invariant range, e.g., a number of 0.1 to a value less than 4.0, e.g., up to about 3.0 and more preferably up to a value less than 2.0. Most preferably, x will be in the range of about 0.15 to about 0.75. In another aspect, the composition used as the initial cathode material will be substantially free of discharge products generated during the discharge of conventional lithium batteries and/or the lithium battery of this invention.

Similarly, where the lithiation of this invention is effected utilizing a lithium compound adding an additional component to the cathode, the corresponding new composition of this invention will have a formula $Li_xFeS_2M_y$ wherein $LiM_y$ is the lithium compound used to prepare the cathode composition by the mentioned lithiation process (e.g., addition of $LiM_y$ to $FeS_2$), and wherein x is the number of moles of lithium added to $FeS_2$ per mole of Fe in the lithiation process.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLE 1

Lithiation of $FeS_2$

The addition of $Li_2S$ and FeS (both 7.0 mole %) to $FeS_2$ (balance) resulted in an overall composition of $Li_{0.15}FeS_2$. Reaction of this mixture in an argon atmosphere at 360° Centigrade for 16 hours yielded the desired three phases which fixed the thermodynamic activities of lithium, sulfur and iron. Intermittent grinding of the mixture between subsequent heatings improved the uniformity of the initial cathode powder.

Use of this multi-phase lithiation compound fixed the cell voltage, in a thermodynamic sense, in a lithium-/iron/disulfide battery at the customary voltage found during mid-discharge (about 1.95V/cell). This is contrasted with standard cathodes initially discharging through an unfixed voltage realm (e.g., 2.3–1.9V per cell), corresponding to the single-phase region in the overall cathode composition.

EXAMPLE 2

Long-Life Thermal Battery

In one important application, there is required a relatively long run time (60 minutes) and, at the same time, an improved voltage regulation. This Long-Life Thermal Battery (LLTB) was required to deliver 0.3 Amperes at a nominal 16 volts, with high reliability for the full one hour. Designs using standard $FeS_2$ cathodes could not reliably meet the end-of-life voltage requirements. Even when individual batteries did meet the 60 minute run time, their voltage regulation was very poor; often going from 23V immediately after activation, to 13V at the end of the required life. The irreproducibility of these voltages was also disturbing.

The improved voltage regulation using lithiated cathodes (per this invention as prepared per example 1) in the 10-cell LLTB is illustrated in FIG. 2. Nonlithiated (solid line) $FeS_2$ cathode LLTB's suffered from a lower "second plateau", as well as the severe voltage "spike" which occurs immediately after battery initiation. Multi-phase lithiated (dashed line) $FeS_2$ cathode LLTB's retained a much more horizontal discharge curve at the end of life, in addition to the total elimination of the initial voltage "spike". This voltage "spike" region is illustrated on an expanded time scale in FIG. 3. The non-lithiated $FeS_2$ (solid line) is characterized by a monotonically decreasing voltage spanning the first 6 minutes of discharge. This abnormally high, transient voltage is generally regarded as detrimental by the users of the battery's power. Lithiated $FeS_2$ (dashed line) reaches the voltage characteristic of the normal Li(-Si)/$FeS_2$ discharge plateau (1.95V/cell) within 400 ms of battery activation.

The polarization of lithiated cathodes is equal to or better than standard cathodes. A current pulse of 460 mA (23 $mA/cm^2$, was applied at 6.7 and 57.2 minutes for a duration of 2.8 minutes, with an addition 10 ms pulse of 1,700 mA (84 $mA/cm^2$) superimposed on it after 2.5 minutes. The lithiated batteries underwent slightly less polarization during the end-of-life pulse than did the non-lithiated batteries, FIG. 4. At pulse midpoint, the lithiated and non-lithiated LLTB's experienced 67 and 78 mV/cell polarizations, respectively, even though the lithiated battery was supplying 10% higher currents by virtue of its 10% higher operating voltage. Therefore, lithiating the cathode substantially improves the voltage regulation for both short and long-term discharge times, Table I.

TABLE 1

VOLTAGE REGULATION OF STANDARD AND LITHIATED THERMAL BATTERIES

| Battery Type | VOLTAGE | | | | VOLTAGE REGULATION | | |
|---|---|---|---|---|---|---|---|
| | Peak (V) | @5 Min. (V) | @30 Min. (V) | @60 Min. (V) | First 5 Min. (%) | First 30 Min. (%) | First 60 Min. (%) |
| Standard | 22.55 | 19.83 | 18.90 | 15.33 | 12.8 | 18 | 38 |
| Lithiated | 19.53 | 19.43 | 18.85 | 17.23 | 0.5 | 3 | 12 |

For the ten-cell Li(Si)/$FeS_2$ long-life thermal battery, voltage regulation is improved from 12.8 to 0.5% during the initial 5 minutes of discharge, from 18 to 3% during the first 30 minutes of discharge, and from 38 to 12% over the entire 60 minute discharge time.

EXAMPLE 3

The multi-phase lithiated cathodes are as rugged as previous standard cathodes, in terms of both battery assembly and final battery environmental survivability. No difference was found between lithiated and nonlithiated LLTB's subjected to temperature shock, sinusoidal vibration, random vibration, haversine shock, calibrated hammer shock, or long-term storage (accelerated aging). In one series of environmental tests, several LLTB's were discharged during calibrated hammer shocks after they had undergone temperature shock, sine vibration, and haversine shock prior to activation. All seven discharge curves were identical during the required 60 minute lifetime; the only differences among them were in the cut-off voltage times which varied from 72 to 80 minutes. This variation undoubtedly reflects differences in thermal losses (electrolyte freezing) rather than electrochemical phenomena.

EXAMPLE 4

Preparation $Li_xFeS_2$ (where x=0.279) was prepared in a very rudimentary manner by reacting $Li_2S$ (12.23 mole %; 5.3 weight %), FeS (12.23 mole %, 10.0 weight %), and $FeS_2$ (balance) at elevated temperatures under flowing Argon gas. No attempt was made to fix the sulfur partial pressure above these reactions, or perform the reactions in a sealed vessel. The reaction was performed three times, interspersed with grinding and mixing of the three phases at ambient temperature between each high temperature reaction: (1) 360° C. for 40 hours; (2) 415° C. for 16 hours; (3) 415° C. for 16 hours.

Test

A 10-cell thermal battery (3815-Sandia Laboratories) utilizing the composition prepared as described above was test run at the same times as a conventional battery using a normal cathode. Both were operated under standard (pulse) load configurations of Sandia. The control battery displayed an initial spike up to 22.5V; a voltage of 19.38V after 5 minutes; a voltage of 19.04V after 24 minutes; and a run time of 65 minutes to the end of the first plateau. The battery using the cathode of this invention had no voltage spike; ran at essentially the same voltages; and ran longer at higher voltage at the end of its lifetime, i.e., 75 minutes to the edge (freeze-out) of the first plateau.

EXAMPLE 5

In Table 2, the high reproducibility of the lithiated cathodes in accordance with this invention is demonstrated both within a given lot and lot-to-lot. Each of the lots was prepared in accordance with the procedure described in Example 1.

| 3815 Multi-Phase Cathode Evaluation | | | | |
|---|---|---|---|---|
| Temp (deg C.) | RT to 13 v (seconds) | Peak Voltage (volts) | Volts at 3600 s (volts) | Time to 13 v (minutes) |
| LOT A | | | | |
| 25 | 0.37 | 19.7 | 17.10 | 75.5 |
| 25* | 0.39 | 19.5 | 16.83 | 72.3** |
| 40 | 0.50 | 19.5 | 16.90 | 75.9*** |
| LOT B | | | | |
| 15 | 0.40 | 19.7 | 17.20 | 73.0 |
| 25 | 0.39 | 19.8 | 16.98 | 74.3 |
| 40 | 0.37 | 19.8 | 16.90 | 80.0 |

*with Thermocouples
**approx. 260 mA Constant Current
***27 ohm first four minutes The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a battery composition useful as the cathode of a $Li/FeS_2$ thermal battery, consisting essentially of substantially pure $FeS_2$, the improvement wherein sufficient lithium is added to said composition whereby the resultant composition falls into a three-phase thermodynamically invariant region of the Li/Fe/S phase diagram and has the formula $Li_xFeS_2$ with the proviso that $0.05 \leq x \leq 1.5$.

2. A substantially pure composition of the formula $Li_xFeS_2$, wherein x is a number sufficient to cause said composition to fall in a three-phase, thermodynamically invariant region of the Li/Fe/S metallurgical phase diagram and $0.05 \leq x \leq 1.5$.

3. A composition of claim 2 substantially free of the cathodic discharge products formed during discharge of a $Li/FeS_2$ thermal battery.

4. In a $Li/FeS_2$ thermal battery comprising an anode and a cathode, the improvement wherein the cathode composition is of the formula $Li_xFeS_2$ with x being about 0.15 to about 0.75, which falls into a three phase thermodynamically invariant region of the Li/Fe/S phase diagram, wherein said lithium is added in the form of lithium metal or $Li_2S$.

* * * * *